United States Patent [19]

Moyer

[11] Patent Number: 5,638,520

[45] Date of Patent: Jun. 10, 1997

[54] METHOD AND APPARATUS FOR DISTRIBUTING BUS LOADING IN A DATA PROCESSING SYSTEM

[75] Inventor: William C. Moyer, Dripping Springs, Tex.

[73] Assignee: Motorola, Inc., Schaumburg, Ill.

[21] Appl. No.: 414,473

[22] Filed: Mar. 31, 1995

[51] Int. Cl.⁶ ................................................. G06F 13/40
[52] U.S. Cl. ................................................. 395/308; 395/306
[58] Field of Search ................................. 395/307, 306, 395/308, 311, 421.01, 421.07

[56] References Cited

U.S. PATENT DOCUMENTS

| | | | |
|---|---|---|---|
| 4,144,562 | 3/1979 | Cooper | 395/308 |
| 4,300,195 | 11/1981 | Raghunathan et al. | 395/800 |
| 4,349,870 | 9/1982 | Shaw et al. | 395/800 |
| 4,443,864 | 4/1984 | McElroy | 395/307 |
| 4,665,477 | 5/1987 | Desmazieres | 364/184 |
| 4,796,221 | 1/1989 | Tokumitsu | 395/421.01 |
| 4,974,143 | 11/1990 | Yamada | 395/421.07 |
| 5,048,012 | 9/1991 | Gulick et al. | 370/77 |
| 5,086,407 | 2/1992 | McGarity et al. | 395/800 |
| 5,109,490 | 4/1992 | Arimilli et al. | 395/325 |
| 5,127,095 | 6/1992 | Kadono | 395/421.01 |
| 5,165,037 | 11/1992 | Culley | 395/800 |
| 5,255,376 | 10/1993 | Frank | 395/325 |
| 5,262,991 | 11/1993 | Pope | 365/189.02 |
| 5,274,784 | 12/1993 | Arimilli et al. | 395/306 |
| 5,359,717 | 10/1994 | Bowles et al. | 395/325 |
| 5,412,656 | 5/1995 | Brand et al. | 370/61 |
| 5,434,982 | 7/1995 | Calzi | 395/325 |
| 5,448,521 | 9/1995 | Curry et al. | 365/189.02 |
| 5,483,660 | 1/1996 | Yishay et al. | 395/280 |

OTHER PUBLICATIONS

Motorola; MC68332 User's Manual; 1990; System Integration Module, pp. 4–27 through 4–46.

*Primary Examiner*—Ayaz R. Sheikh
*Attorney, Agent, or Firm*—Susan C. Hill

[57] ABSTRACT

Method and apparatus for distributing bus loading in a data processing system (11, 13, 15). In one embodiment, the present invention uses a bus loading control register bit field (90) to determine how address and data will be transferred over busses (60, 62) in order to allow more equal distribution of loads on the busses (60, 62). There is no fixed address bus or data bus. Instead, on a per cycle basis, each generic bus (60, 62) can be individually programmed to transfer address only, data only, both address and data, or neither address nor data. In one embodiment, there is a programmable address range (150–153) which corresponds to each bus loading bit field (90–93). For a bus access to a particular address range, the corresponding bus loading bit field (e.g. 90) is used to determine how address and data are transferred across the busses (60, 62).

21 Claims, 5 Drawing Sheets

METHOD AND APPARATUS FOR DISTRIBUTING BUS LOADING IN A DATA PROCESSING SYSTEM

REFERENCE TO RELATED APPLICATION

The present application is related to the following U.S. patent applications:

"Method And Apparatus To Perform Bus Reflection Operation Using A Data Processor", invented by William C. Moyer, having Ser. No.08/396,939, filed March 1995, and assigned to the assignee hereof;

"Method And Apparatus For Performing Multiplexed and Non-multiplexed Bus Cycles In A Data Processing System", invented by Oded Yishay et al., having Ser. No. 08/158,584, filed Nov. 29, 1993, and assigned to the assignee hereof;

"Method And Apparatus In A Data Processing System For Selectively Inserting Bus Cycle Idle Time", invented by Oded Yishay et al., having Ser. No. 08/158,575, filed Nov. 29, 1993, and assigned to the assignee hereof;

"Integrated Circuit Microprocessor With Chip Select Logic", invented by James B. Eifert et al., having Ser. No. 07/432,423, filed Nov. 6, 1989, and assigned to the assignee hereof;

"Data Processor With Controlled Burst Memory Accesses And Method Thereof", invented by Le et al., having Ser. No. 08/363,423, and filed Dec. 21, 1994;

"Modular Chip Select Control Circuit And Method For Performing Pipelined Memory Accesses", invented by Le et al., having Ser. No. 08/298,868, and filed Aug. 31, 1994;

"Integrated Circuit Microprocessor With Programmable Memory Access Interface Types", invented by Le et al., having Ser. No. 08/298,892, and filed Aug. 31, 1994;

"Method for Synchronously Accessing Memory", invented by Le et al., having Ser. No. 08/353,764, and filed Dec. 12, 1994;

"Programmable Pin Configuration Logic Circuit For Providing A Chip Select Signal And Related Method", invented by Le et al., having Ser. No. 08/298,638, and filed Aug. 31, 1994; and "Method for Synchronously Accessing Memory", invented by Le et al., having Ser. No. 08/298,885, and filed Aug. 31, 1994.

FIELD OF THE INVENTION

The present invention relates in general to a data processing system, and more particularly to a method and apparatus for distributing bus loading in a data processing system.

BACKGROUND OF THE INVENTION

The amount of loading on a bus in a data processing system is important to the performance of the data processing system. Most data processing systems have a maximum bus loading (i.e. a maximum resistive and capacitive loading) which each bus can drive and still meet the required voltage and timing specifications for that bus. In addition, even if the loading on a bus is below the maximum specified value, the more loading on a bus, the slower the bus will operate. If multiple busses are used in a data processing system (e.g. a separate address bus and a separate data bus), it is desirable to not have a much greater load on one bus than on the other busses.

A data processor, such as a microcomputer integrated circuit, is used with a wide range of peripheral devices, for example memory integrated circuits and application specific integrated circuits (ASICs) in a data processing system. Some peripheral devices use multiplexed address and data busses, and some peripheral devices use non-multiplexed address and data busses. In addition, some peripherals may act only as bus slaves, while other peripherals may act as either bus slaves or bus masters.

It is not uncommon for a data processing system to have unequally loaded busses (e.g. address and data busses) because of the particular configuration of peripheral devices which are coupled to the data processor. A solution was needed which would more evenly distribute bus loading between various busses in a data processing system, without adding significant cost to the system.

DESCRIPTION OF THE PREFERRED EMBODIMENTS

The present invention allows more even distribution of bus loading between various busses in a data processing system, without adding significant cost to the system.

Figure 4:
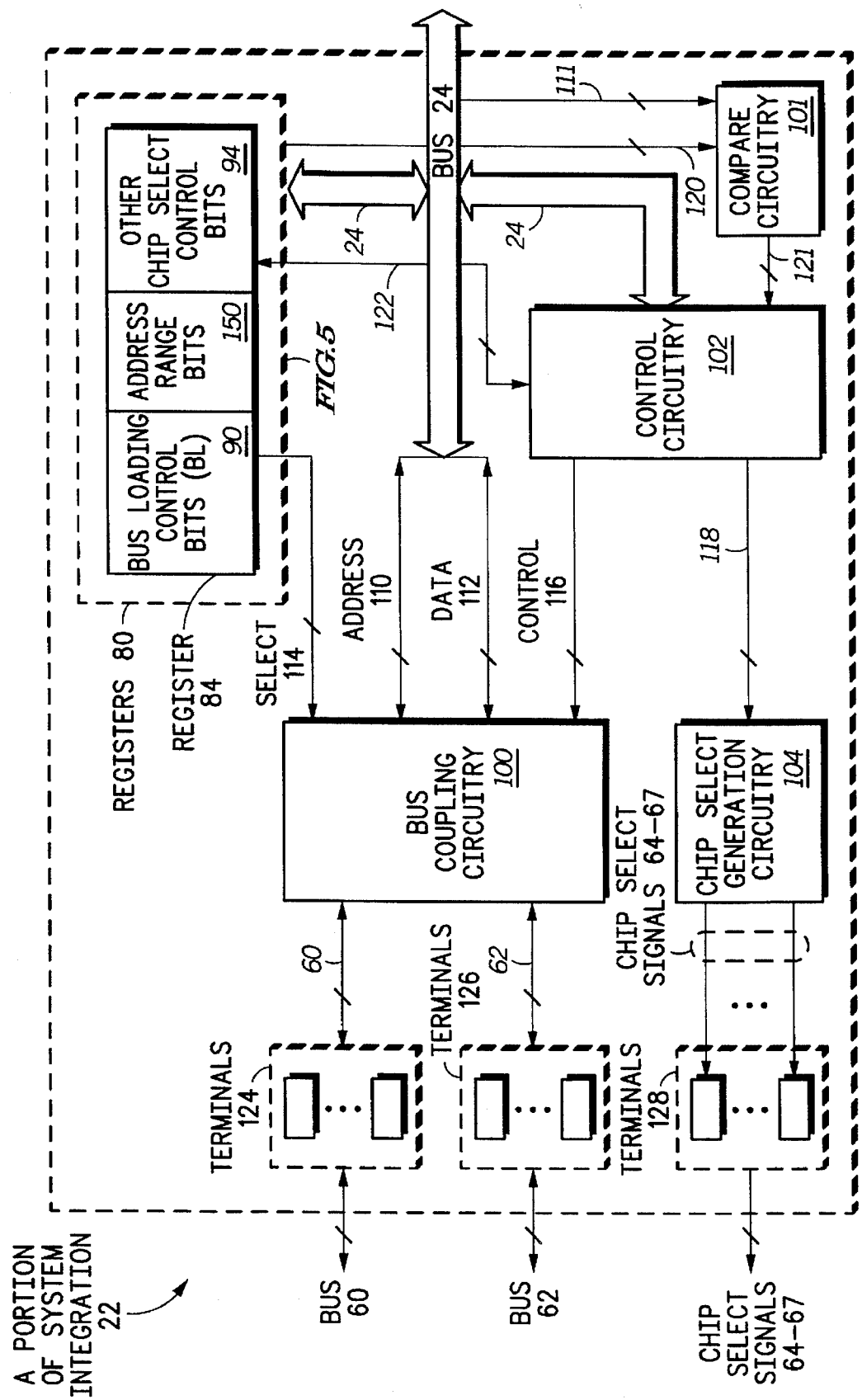
FIG. 4 illustrates, in block diagram form, a portion of system integration circuitry 22 of FIGS. 1–3 in accordance with one embodiment of the present invention.

Referring to FIG. 4, in one embodiment, the present invention uses a bus loading control register bit field 90 to determine how address and data will be transferred over busses 60 and 62 in order to allow more equal distribution of loads on busses 60 and 62. There is no fixed address bus or data bus. Instead, on a dynamic, per cycle basis, each generic bus 60, 62 can be individually programmed to transfer address only, data only, both address and data, or neither address nor data. In addition, since the control registers 80 only need to be programmed once out of reset, back to back bus cycles can use busses 60 and 62 in entirely different configurations without the need for any software or hardware changes.

Figure 5:
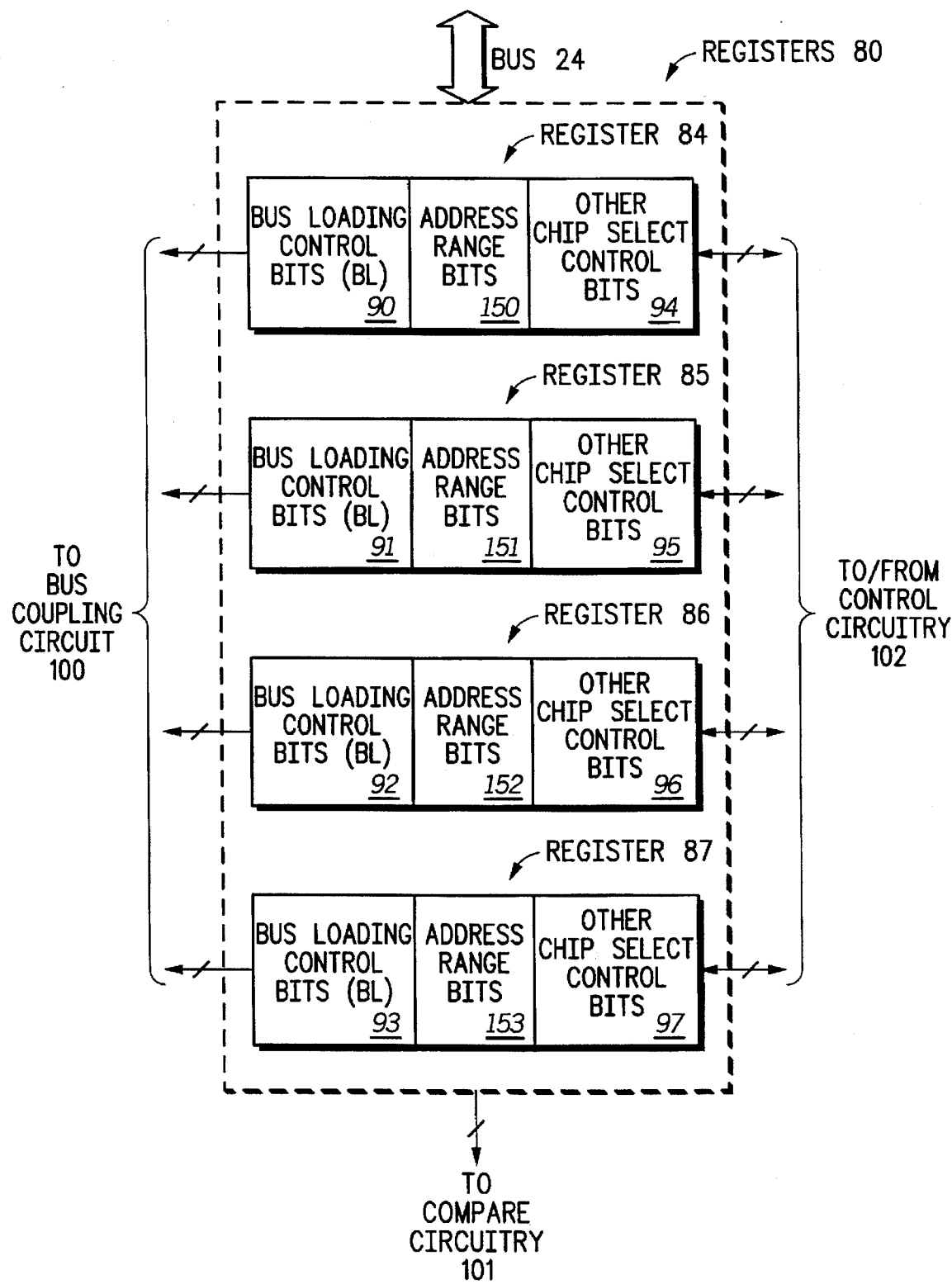
FIG. 5 illustrates, in block diagram form, registers 80 of FIG. 4 in accordance with one embodiment of the present invention.

Referring to FIG. 5, in one embodiment of the present invention, there is a programmable address range 150–153 which corresponds to each bus loading control register bit field 90–93. For a bus access to a particular address range, the corresponding bus loading control register bit field (e.g. 90) is used to determine how address and data are transferred across the busses 60 and 62. Thus a bus (e.g. 60 or 62) may transfer only an address value for a first bus cycle, may transfer only a data value for a second bus cycle, and may transfer both an address value and a data value in a multiplexed manner for a third bus cycle. Note that the first, second, and third bus cycles may occur back to back, with no need to program any register or control bits between bus cycles.

In addition, the present invention may be used to minimize the interconnect required between a data processor and its associated peripherals without requiring the addition of any "glue logic" between the data processor and the peripherals.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

Brackets will be used to indicate the conductors of a bus or the bit locations of a value. For example, "bus 60 [0–7]" or "conductors [0–7] of bus 60" indicates the eight lower order conductors of bus 60, and "address bits [0–7]" or "ADDRESS [0–7]" indicates the eight lower order bits of an address value. The symbol "$" preceding a number indicates that the number is represented in its hexadecimal or base sixteen form. The symbol "%" preceding a number indicates that the number is represented in its binary or base two form.

DESCRIPTION OF THE FIGURES

Figure 1:
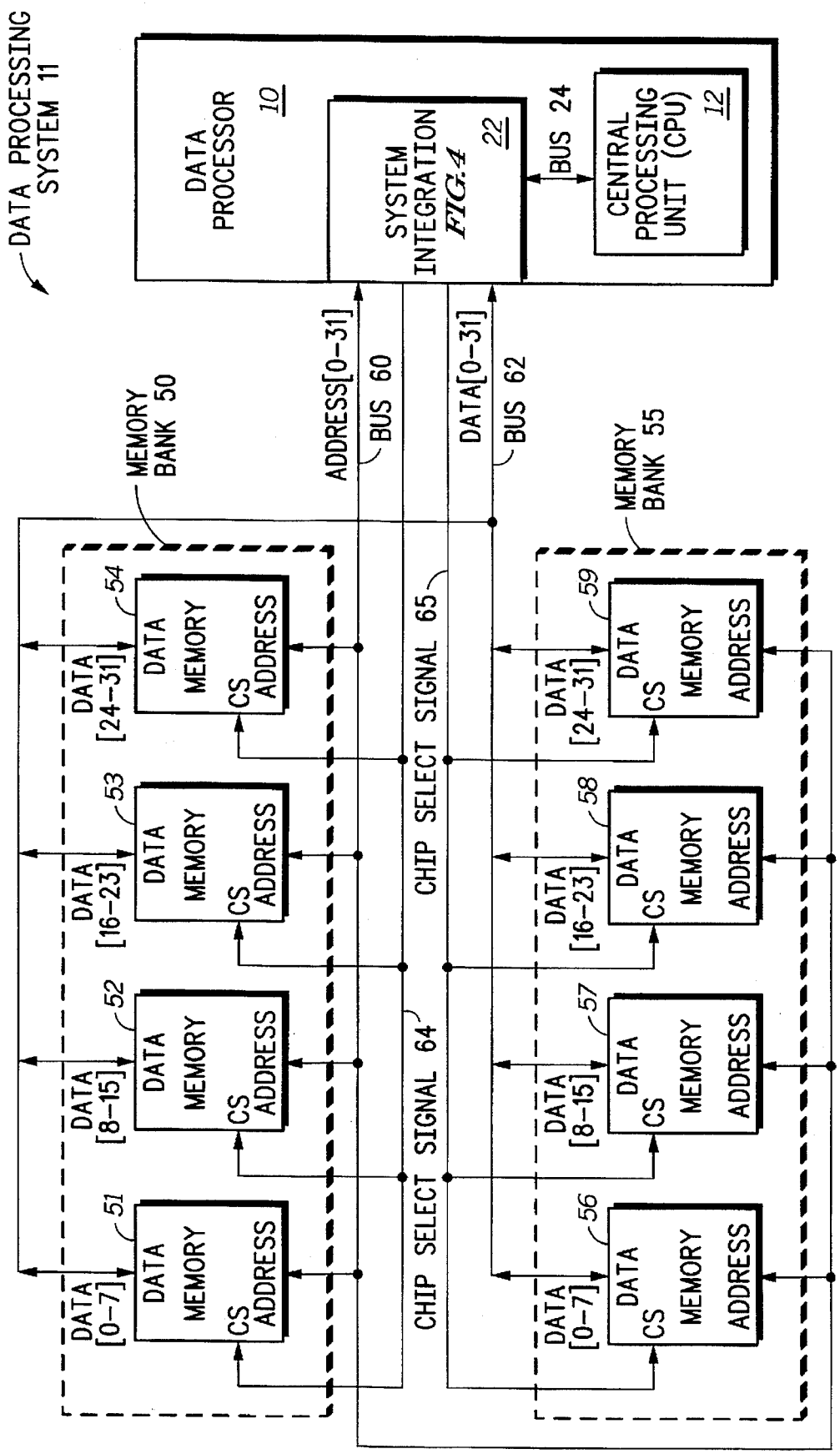
FIG. 1 illustrates, in block diagram form, a data processing system 11 in accordance with one embodiment of the present invention.

FIG. 1 illustrates a data processing system 11 having a data processor 10, a memory bank 50, and a memory bank 55. Data processor 10 is coupled to memory bank 50 by way of busses 60 and 62 and by way of chip select conductor 64. Data processor 10 is coupled to memory bank 55 by way of busses 60 and 62 and by way of chip select conductor 65. Although the embodiments of the present invention illustrated in FIGS. 1–4 illustrate bus 60 and bus 62 as being 32-bit busses, alternate embodiments of the present invention may use any number of conductors in each bus.

Data processor 10 includes central processing unit (CPU) circuitry 12 and system integration circuitry 22 which are bi-directionally coupled by way of bus 24. Memory bank 50 includes memories 51–54, and memory bank 55 includes memories 56–59. In one embodiment of the present invention, data processor 10 and each one of memories 51–54 and 56–59 is implemented by way of a separate integrated circuit. In alternate embodiments of the present invention, all of data processing system 11 may be implemented on one integrated circuit. The present invention may be used to more equally distribute bus loading within a single integrated circuit, between integrated circuit on a board, or between more remotely distributed systems.

Still referring to FIG. 1, memory 51 has a data port which is coupled to conductors [0–7] of bus 62 for receiving data bits [0–7]. Memory 51 also has an address port which is coupled to conductors [0–31] of bus 60. In addition, memory 51 has a chip select input which is coupled to conductor 64 for receiving a chip select signal. Memory 52 has a data port which is coupled to conductors [8–15] of bus 62 for receiving data bits [8–15]. Memory 52 also has an address port which is coupled to conductors [0–31] of bus 60. In addition, memory 52 has a chip select input which is coupled to conductor 64 for receiving a chip select signal. Memory 53 has a data port which is coupled to conductors [16–23] of bus 62 for receiving data bits [16–23]. Memory 53 also has an address port which is coupled to conductors [0–31] of bus 60. In addition, memory 53 has a chip select input which is coupled to conductor 64 for receiving a chip select signal. And, memory 54 has a data port which is coupled to conductors [24–31] of bus 62 for receiving data bits [24–31]. Memory 54 also has an address port which is coupled to conductors [0–31] of bus 60. In addition, memory 54 has a chip select input which is coupled to conductor 64 for receiving a chip select signal.

Similarly, memory 56 has a data port which is coupled to conductors [0–7] of bus 62 for receiving data bits [0–7]. Memory 56 also has an address port which is coupled to conductors [0–31] of bus 60. In addition, memory 56 has a chip select input which is coupled to conductor 65 for receiving a chip select signal. Memory 57 has a data port which is coupled to conductors [8–15] of bus 62 for receiving data bits [8–15]. Memory 57 also has an address port which is coupled to conductors [0–31] of bus 60. In addition, memory 57 has a chip select input which is coupled to conductor 65 for receiving a chip select signal. Memory 58 has a data port which is coupled to conductors [16–23] of bus 62 for receiving data bits [16–23]. Memory 58 also has an address port which is coupled to conductors [0–31] of bus 60. In addition, memory 58 has a chip select input which is coupled to conductor 65 for receiving a chip select signal. And, memory 59 has a data port which is coupled to conductors [24–31] of bus 62 for receiving data bits [24–31]. Memory 59 also has an address port which is coupled to conductors [0–31] of bus 60. In addition, memory 59 has a chip select input which is coupled to conductor 65 for receiving a chip select signal.

Figure 2:
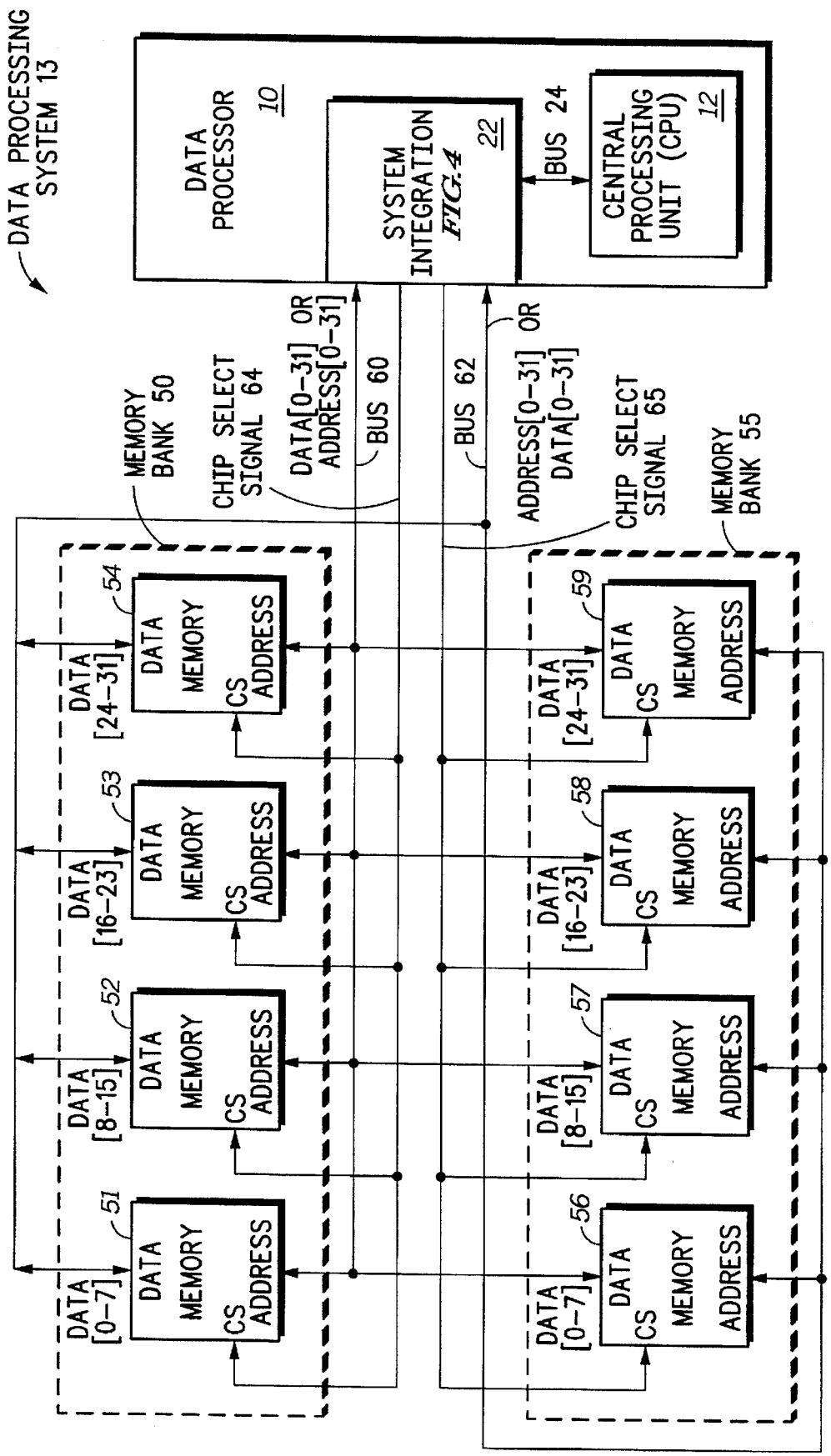
FIG. 2 illustrates, in block diagram form, a data processing system 13 in accordance with an alternate embodiment of the present invention.

Referring now to FIG. 2, FIG. 2 illustrates a data processing system 13 having a data processor 10, a memory bank 50, and a memory bank 55. Data processor 10 is coupled to memory bank 50 by way of busses 60 and 62 and by way of chip select conductor 64. Data processor 10 is coupled to memory bank 55 by way of busses 60 and 62 and by way of chip select conductor 65.

Data processor 10 includes central processing unit (CPU) circuitry 12 and system integration circuitry 22 which are bi-directionally coupled by way of bus 24. Memory bank 50 includes memories 51–54, and memory bank 55 includes memories 56–59. In one embodiment of the present invention, data processor 10 and each one of memories 51–54 and 56–59 is implemented by way of a separate integrated circuit. In alternate embodiments of the present invention, all of data processing system 13 may be implemented on one integrated circuit. The present invention may be used to more equally distribute bus loading within a single integrated circuit, between integrated circuit on a board, or between more remotely distributed systems.

Memory bank 50 in FIG. 2 is coupled to busses 60 and 62 in the same manner as memory bank 50 in FIG. 1. Memory 51 has a data port which is coupled to conductors [0–7] of bus 62 for receiving data bits [0–7]. Memory 51 also has an address port which is coupled to conductors [0–31] of bus 60. In addition, memory 51 has a chip select input which is coupled to conductor 64 for receiving a chip select signal. Memory 52 has a data port which is coupled to conductors [8–15] of bus 62 for receiving data bits [8–15]. Memory 52 also has an address port which is coupled to conductors [0–31] of bus 60. In addition, memory 52 has a chip select input which is coupled to conductor 64 for receiving a chip select signal. Memory 53 has a data port which is coupled to conductors [16–23] of bus 62 for receiving data bits [16–23]. Memory 53 also has an address port which is coupled to conductors [0–31] of bus 60. In addition, memory 53 has a chip select input which is coupled to conductor 64 for receiving a chip select signal. And, memory 54 has a data port which is coupled to conductors [24–31] of bus 62 for receiving data bits [24–31]. Memory 54 also has an address port which is coupled to conductors [0–31] of bus 60. In addition, memory 54 has a chip select input which is coupled to conductor 64 for receiving a chip select signal.

Note that memory bank 55 in FIG. 2 is coupled to busses 60 and 62 in a different manner than memory bank 55 in FIG. 1. In FIG. 1, the data ports of memories 56–59 are coupled to bus 62, while the address ports of memories 56–59 are coupled to bus 60. However, in FIG. 2, the role of bus 60 and bus 62 are reversed. In FIG. 2, the data ports of memories 56–59 are coupled to bus 60, while the address ports of memories 56–59 were coupled to bus 62. Thus in data processing system 13, bus 60 transfers both address values and data values, namely address bits [0–31] and data bits [0–31].

Still referring to FIG. 2, memory 56 has a data port which is coupled to conductors [0–7] of bus 60 for receiving data bits [0–7]. Memory 56 also has an address port which is coupled to conductors [0–31] of bus 62. In addition, memory 56 has a chip select input which is coupled to conductor 65 for receiving a chip select signal. Memory 57 has a data port which is coupled to conductors [8–15] of bus 60 for receiving data bits [8–15]. Memory 57 also has an address port which is coupled to conductors [0–31] of bus 62. In addition, memory 57 has a chip select input which is coupled to conductor 65 for receiving a chip select signal. Memory 58 has a data port which is coupled to conductors [16–23] of bus 60 for receiving data bits [16–23]. Memory 58 also has an address port which is coupled to conductors [0–31] of bus 62. In addition, memory 58 has a chip select input which is coupled to conductor 65 for receiving a chip select signal. And, memory 59 has a data port which is coupled to conductors [24–31] of bus 60 for receiving data bits [24–31]. Memory 59 also has an address port which is coupled to conductors [0–31] of bus 62. In addition, memory 59 has a chip select input which is coupled to conductor 65 for receiving a chip select signal.

Figure 3:
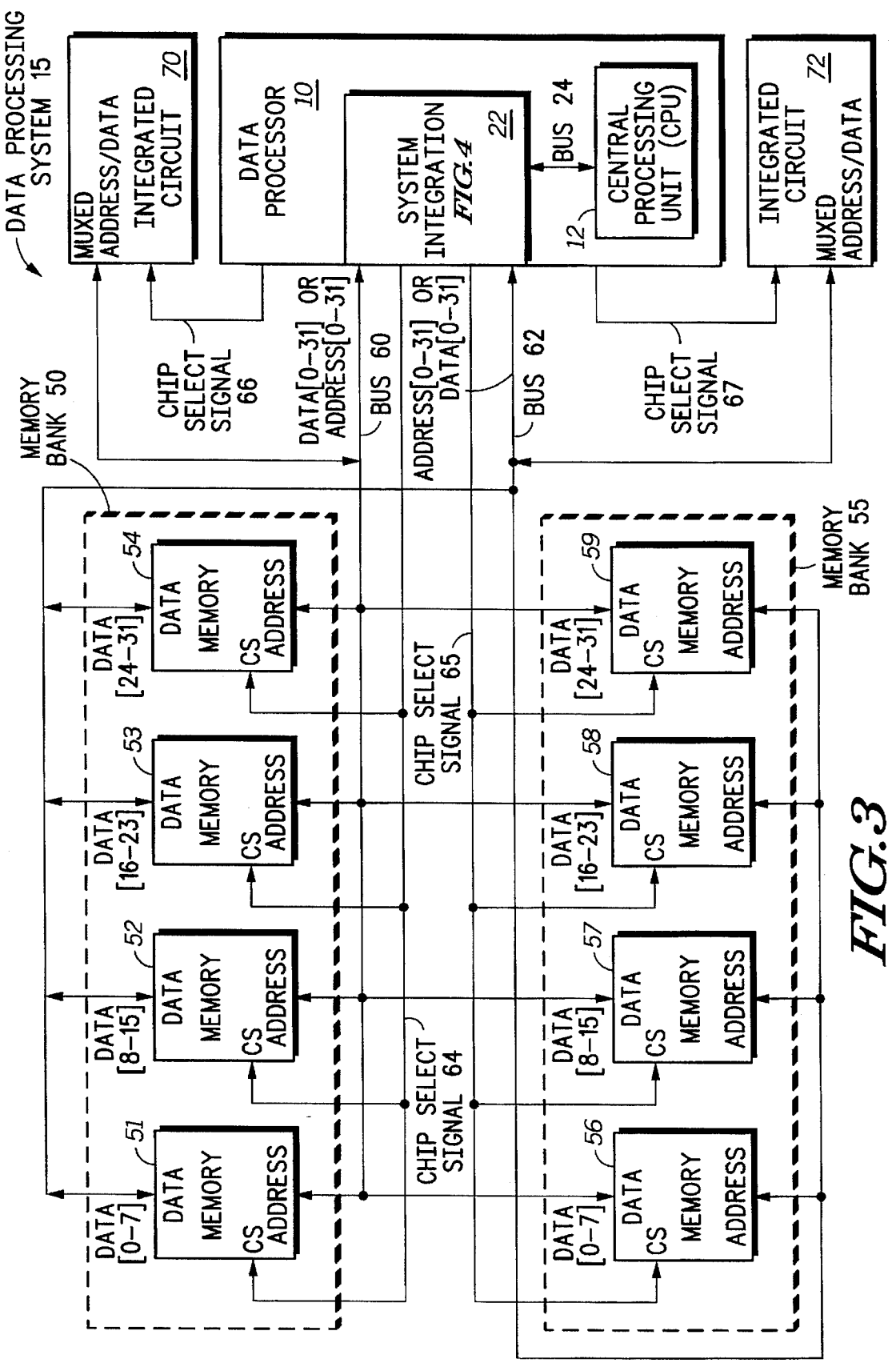
FIG. 3 illustrates, in block diagram form, a data processing system 15 in accordance with an alternate embodiment of the present invention.

Referring now to FIG. 3, FIG. 3 illustrates a data processing system 15 having a data processor 10, a memory bank 50, a memory bank 55, an integrated circuit 70, and an integrated circuit 72. Memory banks 50 and 55 in FIG. 3 are coupled to busses 60 and 62 and chip select conductors 64–65 in the exact same manner as illustrated in FIG. 2 and described in the text above.

Data processor 10 is coupled to memory bank 50 by way of busses 60 and 62 and by way of chip select conductor 64. Data processor 10 is coupled to memory bank 55 by way of busses 60 and 62 and by way of chip select conductor 65. Data processor 10 is coupled to integrated circuit 70 by way of bus 60 and by way of chip select conductor 66. A muxed address/data port of integrated circuit 70 communicates both address and data values by way of bus 60. Integrated circuit 70 is not coupled to and does not receive any address or data values by way of bus 62. Data processor 10 is coupled to integrated circuit 72 by way of bus 62 and by way of chip select conductor 67. A muxed address/data port of integrated circuit 72 communicates both address and data values by way of bus 62. Integrated circuit 70 is not coupled to and does not receive any address or data values by way of bus 60.

Data processor 10 includes central processing unit (CPU) circuitry 12 and system integration circuitry 22 which are bi-directionally coupled by way of bus 24. Memory bank 50 includes memories 51–54, and memory bank 55 includes memories 56–59. In one embodiment of the present invention, data processor 10 and each one of memories 51–54 and 56–59 is implemented by way of a separate integrated circuit. In alternate embodiments of the present invention, all of data processing system 15 may be implemented on one integrated circuit. The present invention may be used to more equally distribute bus loading within a single integrated circuit, between integrated circuit on a board, or between more remotely distributed systems.

Referring to FIGS. 1–3, in some embodiments of the present invention, data processor 10 is formed on a single integrated circuit. In some embodiment, data processor 10 is a single chip microcontroller. In alternate embodiments, data processor 10 may be implemented using any type of electrical circuitry. Memories 51–54 and 56–59 may be any type of memory. Alternate embodiments of data processing systems 11, 13, and 15 may include more, fewer, or different peripheral devices (51–54, 56–59, 70, and 72). In addition, although busses 60 and 62 have been illustrated as 32-bit busses, alternate embodiment of the present invention may use any number of bits in busses 60 and 62.

Referring now to FIG. 4, FIG. 4 illustrates a portion of system integration circuitry 22 of FIGS. 1–3 in accordance with one embodiment of the present invention. System integration circuitry 22 includes registers 80, bus coupling circuit 100, compare circuitry 101, control circuitry 102, chip select generation circuitry 104, terminals 124, terminals 126, and terminals 128. Bus 24 bi-directionally transfers address, data, and control information. Address bus 110 is the portion of bus 24 which provides address bits [0–31], data bus 112 is the portion of bus 24 which provides data bits [0–31], and the control portion of bus 24 is provided to control circuitry 102. Note that in some embodiments of the present invention, control circuitry 102 may provide external bus cycle control signals (e.g. address strobe, data strobe, write enable, column address strobe, row address strobe, read/write, etc.) external to data processor 10 by way of one or more terminals (not shown). Bus 24 is coupled to registers 80 in order for CPU 12 to perform read and write accesses to registers 80. Bus 24 is coupled to control circuitry 102 in order to provide and receive control information. Bus 24 is coupled to bus coupling circuit 100 by way of address bus 110 and data bus 112 in order to communicate address bits [0–31] and data bits [0–31]. And, bus 24 is coupled to compare circuitry 101 to provide at least a portion of address bits [0–31].

Registers 80 include register 84. Register 84 includes bus loading control bits 90, address range bits 150, and other chip select control bits 94. Bus loading control bits 90 are provided to bus coupling circuit 100 by way of conductors 114. Compare circuitry 101 is coupled to registers 80 to receive the address range bits 150, and possibly one or more of the other chip select control bits 94. Compare circuitry 101 provides compare results signals to control circuitry 102 by way of conductors 121. Control circuitry 102 provides control signals to bus coupling circuit 100 by way of conductors 116, and control circuitry 102 provides control signals to chip select generation circuitry 104 by way of conductors 118. Control circuitry 102 is bi-directionally coupled to registers 80. In one embodiment of the present invention, control circuitry 102 receives control bits from other chip select control bits 94 and provides status information back to other chip select control bits 94. Note that in alternate embodiments of the present invention, the functionality of control circuitry 102 and bus coupling circuit 100 may be combined into one circuit.

Bus coupling circuit 100 is bi-directionally coupled to terminals 124 by way of bus 60. Bus coupling circuit 100 is bi-directionally coupled to terminals 126 by way of bus 62. Chip select generation circuitry 104 is bi-directionally coupled to terminals 128 by way of chip select conductors 64–67. The plurality of terminals 124 are used to provide bus 60 external to data processor 10. The plurality of terminals 126 are used to provide bus 62 external to data processor 10.

And, the plurality of terminals 128 are used to provide chip select signals 64–67 external to data processor 10.

Integrated circuit terminals 124, 126, and 128 may be any type of apparatus which allows electrical signals to be transferred to or from data processor 10. For example, integrated circuit terminals 124, 126, and 128 may be integrated circuit pins, solder bumps, wire conductors, etc.

Referring now to FIG. 5, FIG. 5 illustrates registers 80 of FIG. 4 in accordance with one embodiment of the present invention. In one embodiment of the present invention, registers 80 include a register 84, a register 85, a register 86, and a register 87. Each one of the registers 84–87 corresponds to one of the chip select signals 64–67, respectively. Register 84 includes bus loading control bits 90, address range bits 150, and other chip select control bits 94. Register 85 includes bus loading control bits 91, address range bits 151, and other chip select control bits 95. Register 86 includes bus loading control bits 92, address range bits 152, and other chip select control bits 96. And, register 87 includes bus loading control bits 93, address range bits 153, and other chip select control bits 97. Bus loading control bits 90–93 are provided to bus coupling circuit 100 by way of conductors 114. Compare circuitry 101 is coupled to registers 80 to receive the address range bits 150, and possibly one or more of the other chip select control bits 94. Control circuitry 102 is bi-directionally coupled to registers 84–87. In one embodiment of the present invention, control circuitry 102 receives control bits from other chip select control bits 94–97 and provides status information back to other chip select control bits 94–97.

In one embodiment of the present invention, registers 80 include several register bit fields 90–93, 150–153, and 94–97, each of which includes a storage circuit for storing a control or status value. Although the register 84 illustrated in FIG. 4 includes at least three register fields (90, 150, and 94), alternate embodiments of the present invention may use more, fewer, or different register bit fields, and each register bit field may be used for control, status, or both control and status. In addition, alternate embodiment of the present invention may locate the bit fields 90–93, 150–153, and 94–97 in one or more separate registers. Also, different embodiments of the present invention may include any numbers of bits for each of the register bits fields 90–93, 150–153, and 94–97 illustrated in FIG. 5. In some embodiments of the present invention, the control functionality of one or more of the register bit fields may be combined and encoded into fewer register bit fields.

Operation of the Preferred Embodiments

The operation of the present invention will now be discussed. FIGS. 1–3 illustrate three different data processing systems 11, 13, and 15, respectively. Data processing systems 11, 13, and 15 all include the same data processor 10 and the same memory banks 50 and 55. Data processing system 15 (see FIG. 3) also includes integrated circuits 70 and 72, each of which requires a single multiplexed address/data bus. The primary difference between FIGS. 1, 2, and 3 is the manner in which the peripherals (e.g. memories 51–54 and 56–59) are coupled to data processor 10, and the bus loading mode which is selected by the bus loading control bits (e.g. see 90 in FIG. 4). The bits in registers 80 may be programmed by a write access from CPU 12. In alternate embodiments of the present invention, the bits in registers 80 may also be programmed by another bus master (e.g. integrated circuit 70 in FIG. 5).

The bus loading control bits 90–93 (see FIG. 5) select the bus loading mode in the following manner.

Bus loading Control Bits (BL) 90
(used if the address for a bus cycle is within the address range defined by the address range bits 150)
%00-bus 60 [0:31] serves as the address bus; and bus 62 [0:31] serves as the data bus.
%01-bus 60 [0:31] serves as both the address and data bus.
%10-bus 62 [0:31] serves as both the address and data bus.
%11-bus 62 [0:31] serves as the address bus; and bus 60 [0:31] serves as the data bus.

Bus loading Control Bits (BL) 91.
(used if the address for a bus cycle is within the address range defined by the address range bits 151)
%00-bus 60 [0:31] serves as the address bus; and bus 62 [0:31] serves as the data bus.
%01-bus 60 [0:31] serves as both the address and data bus.
%10-bus 62 [0:31] serves as both the address and data bus.
%11-bus 62 [0:31] serves as the address bus; and bus 60 [0:31] serves as the data bus.

Bus loading Control Bits (BL) 92
(used if the address for a bus cycle is within the address range defined by the address range bits 152)
%00-bus 60 [0:31] serves as the address bus; and bus 62 [0:31] serves as the data bus.
%01-bus 60 [0:31] serves as both the address and data bus.
%10-bus 62 [0:31] serves as both the address and data bus.
%11-bus 62 [0:31], serves as the address bus; and bus 60 [0:31] serves as the data bus.

Bus loading Control Bits (BL) 93
(used if the address for a bus cycle is within the address range defined by the address range bits 153)
%00-bus 60 [0:31] serves as the address bus; and bus 62 [0:31] serves as the data bus.
%01-bus 60 [0:31] serves as both the address and data bus.
%10-bus 62 [0:31] serves as both the address and data bus.
%11-bus 62 [0:31] serves as the address bus; and bus 60 [0:31] serves as the data bus.

For the purpose of discussion, each individual peripheral integrated circuit 51, 52, 53, 54, 56, 57, 58, 59, 70, and 72 illustrated in FIGS. 1–3 will represent an approximately equal bus load. For example, referring to FIG. 3, memory 54 and integrated circuit 70 are each coupled to bus 60 [0:31], and therefore represent two loads on bus 60 [0:31]. In determining bus loading, it is important to note that each data port of memories 51–54 and 56–59 is coupled to only 8-bits of a 32-bit bus; therefore as an example, in FIG. 1 memories 51–54 represent only one load on bus 62 [0:31].

The bus loading of busses 60 and 62 is as follows for FIGS. 1–3.

FIG. 1: data processing system 11
bus 60 [0:31] has eight loads
bus 62 [0:31] has two loads
FIG. 2: data processing system 13
bus 60 [0:31] has five loads
bus 62 [0:31] has five loads
FIG. 3: data processing system 15
bus 60 [0:31] has six loads
bus 62 [0:31] has six loads Referring to FIG. 1, data processing system 11 has very unbalanced bus loading. Bus 60 [0:31] has eight loads, while bus 62 [0:31] has only two loads. Referring to bus 60, each 32-bit address port of memories 51–54 and 56–59 is coupled to all 32-bits of bus 60. And referring to bus 62, bus 62 [0:31] has only two loads because the 8-bits data ports of only two of memories 51–54 and 56–59 are coupled to each 8-bits of bus 60.

Referring to FIG. 1 and FIG. 5, memory bank 50 is selected by chip select signal 64. Register 84, which corresponds to chip select signal 64, is used to determine the bus loading mode (bits 90), the address range (bits 150) and the other characteristics (bits 94) of chip select signal 64 and accesses to memory bank 50. Memory bank 55 is selected by chip select signal 65. Register 85, which corresponds to chip select signal 65, is used to determine the bus loading mode (bits 91), the address range (bits 151) and the other characteristics (bits 95) of chip select signal 65 and accesses to memory bank 55.

Referring to FIG. 1, bus loading mode bits 90 are programmed to %00 so that accesses to memory bank 50 use bus 60 [0:31] as the address bus to transfer the address value [0:31] and use bus 62 [0:31] as the data bus to transfer the data value [0:31]. Bus loading mode bits 91 are programmed to %00 so that accesses to memory bank 55 use bus 60 [0:31] as the address bus to transfer the address value [0:31] and use bus 62 [0:31] as the data bus to transfer the data value [0:31]. Thus, for the data processing system 11 illustrated in FIG. 1, bus 60 is only used to transfer 32-bit address values, and bus 62 is only used to transfer 32-bit data values. Data processing system 11 therefore functions in a similar manner to a prior art data processing system which uses dedicated address and data busses. Unfortunately, however, by using bus 60 as a dedicated address bus and bus 62 as a dedicated data bus, the bus loading on bus 60 (i.e. eight loads) is much greater than the bus loading on bus 62 (i.e. two loads).

Data processing system 13 (see FIG. 2) illustrates how the present invention may be used to balance the bus loading on busses 60 and 62. Data processing system 13 in FIG. 2 may use the same memory banks 50 and 55 and the same data processor 10 as in FIG. 1. However, in FIG. 2, the present invention allows the functionality of busses 60 and 62 to be changed for different bus cycles.

Referring to FIG. 2, bus loading mode bits 90 are programmed to %00 so that accesses to memory bank 50 use bus 60 [0:31] as the address bus to transfer the address value [0:31] and use bus 62 [0:31] as the data bus to transfer the data value [0:31]. Bus loading mode bits 91 are programmed to %11 so that accesses to memory bank 55 use bus 62 [0:31] as the address bus to transfer the address value [0:31] and use bus 60 [0:31] as the data bus to transfer the data value [0:31]. Thus, for the data processing system 13 illustrated in FIG. 2, bus 60 may be used to transfer 32-bit address values or 32-bit data values, and bus 62 may be used to transfer 32-bit address values or 32-bit data values. Data processing system 13 thus does not use dedicated address and data busses. And as a result, the bus loading on bus 60 (i.e. five loads) may be equalized to the bus loading on bus 62 (i.e. five loads).

Referring to FIG. 2, data processing system 13 has much more equal bus loading than data processing system 11 of FIG. 1. Bus 60 [0:31] has five loads, and bus 62 [0:31] also has five loads. Referring to bus 60, each 32-bit address port of memories 51–54 is coupled to all 32-bits of bus 60, and the data port of only one of memories 56–59 is coupled to each 8-bits of bus 60. And similarly, referring to bus 62, bus 62 [0:31] has five loads because each 32-bit address port of memories 56–59 is coupled to all 32-bits of bus 62, and the data port of only one of memories 51–54 is coupled to each 8-bits of bus 62).

Referring to FIG. 2 and FIG. 5, memory bank 50 is selected by chip select signal 64. Register 84, which corresponds to chip select signal 64, is used to determine the bus loading mode (bits 90), the address range (bits 150) and the other characteristics (bits 94) of chip select signal 64 and accesses to memory bank 50. Memory bank 55 is selected by chip select signal 65. Register 85, which corresponds to chip select signal 65, is used to determine the bus loading mode (bits 91), the address range (bits 151) and the other characteristics (bits 95) of chip select signal 65 and accesses to memory bank 55.

Data processing system 15 (see FIG. 3) illustrates how the present invention may be used to balance the bus loading on busses 60 and 62 if both non–multiplexed peripherals (e.g. memories 51–54 and 56–59) are used along with multiplexed peripherals (e.g. integrated circuits 70 and 72). Data processing system 15 in FIG. 3 may use the same memory banks 50 and 55 and the same data processor 10 as in FIG. 1. However, in FIG. 3, the present invention allows the functionality of busses 60 and 62 to be changed for different bus cycles.

Referring to FIG. 3, bus loading mode bits 90 are programmed to %00 so that accesses to memory bank 50 use bus 60 [0:31] as the address bus to transfer the address value [0:31] and use bus 62 [0:31] as the data bus to transfer the data value [0:31]. Bus loading mode bits 91 are programmed to %11 so that accesses to memory bank 55 use bus 62 [0:31] as the address bus to transfer the address value [0:31] and use bus 60 [0:31] as the data bus to transfer the data value [0:31]. Bus loading mode bits 92 are programmed to %01 so that accesses to integrated circuit 70 use bus 60 [0:31] in a multiplexed fashion as both the address and data bus to transfer both the address value [0:31] and the data value [0:31]. Bus 62 [0:31] is not used at all for accesses to integrated circuit 70. Bus loading mode bits 93 are programmed to %10 so that accesses to integrated circuit 72 use bus 62 [0:31] in a multiplexed fashion as both the address and data bus to transfer both the address value [0:31] and the data value [0:31]. Bus 60 [0:31] is not used at all for accesses to integrated circuit 72.

Thus, for the data processing system 15 illustrated in FIG. 3, bus 60 may be used to transfer non-multiplexed address values, non-multiplexed data values, multiplexed address and data values, or no values at all. Likewise, bus 62 may be used to transfer non-multiplexed address values, non-multiplexed data values, multiplexed address and data values, or no values at all. Data processing system 15 thus does not use dedicated address and data busses, and does not use dedicated non-multiplexed or multiplexed busses. And as a result, the bus loading on bus 60 (i.e. six loads) may be equalized to the bus loading on bus 62 (i.e. six loads).

Referring to FIG. 3, data processing system 15 also has much more equal bus loading than data processing system 11 of FIG. 1. Bus 60 [0:31] has six loads, and bus 62 [0:31] also has six loads. The memories 51–54 and 56–59 are coupled to busses 60 and 62 in the same manner as for data processing system 13 in FIG. 2. However, data processing system 15 in FIG. 3 illustrates how two multiplexed peripheral devices 70 and 72 may be added to a data processing system 15 without interfering with the balanced bus loading achieved in FIG. 2. Referring to bus 60, in addition to the same five loads from FIG. 2, bus 60 in FIG. 3 also has a sixth load because the muxed address/data port of integrated circuit 70 is coupled to all 32-bits of bus 60. And similarly, referring to bus 62, in addition to the same five loads from FIG. 2, bus 62 in FIG. 3 also has a sixth load because the muxed address/data port of integrated circuit 72 is coupled to all 32-bits of bus 62.

Referring to FIG. 3 and FIG. 5, memory bank 50 is selected by chip select signal 64. Register 84, which corresponds to chip select signal 64, is used to determine the bus loading mode (bits 90), the address range (bits 150) and the other characteristics (bits 94) of chip select signal 64 and accesses to memory bank 50. Memory bank 55 is selected by chip select signal 65. Register 85, which corresponds to chip select signal 65, is used to determine the bus loading mode (bits 91), the address range (bits 151) and the other characteristics (bits 95) of chip select signal 65 and accesses to memory bank 50. Register 86, which corresponds to chip select signal 66, is used to determine the bus loading mode (bits 92), the address range (bits 152) and the other characteristics (bits 96) of chip select signal 66 and accesses to integrated circuit 70. Register 87, which corresponds to chip select signal 67, is used to determine the bus loading mode (bits 93), the address range (bits 153) and the other characteristics (bits 97) of chip select signal 67 and accesses to integrated circuit 72.

The operation of the circuitry illustrated in FIG. 4 will now be discussed. CPU 12 (see FIGS. 1–3) is capable of initiating an external bus cycle. An external bus cycle is a bus cycle that is driven external to data processor 10 by way of busses 60 and 62. CPU 12 initiates an external bus cycle by driving an address value, a corresponding data value, and appropriate control signals on bus 24. Compare circuitry 101 receives the address value from bus 24 and the address range bits 150–153 from registers 80. Compare circuitry 101 then determines which address range the received address value is associated with. In one embodiment of the present invention, compare circuitry 101 compares at least a portion of the address value from bus 24 to each set of address range bits 150–153 from registers 80. Address range bits 150 may use any method and any number of bit fields to specify an address range.

Compare circuitry 101 then transfers control signals 121 to control circuitry 102. Control signals 121 indicate to control circuitry 102 which address range, and thus which chip select and which one of registers 80, will be used. Control circuitry 102 then sends control signals 118 to chip select generation circuitry 104 to select which chip select signal is to be asserted. Control circuitry 102 also sends control signals to register 80 by way of conductors 122 to select which one of registers 80 will be used. For example, if the received address value was in the address range specified by address range bits 150, control circuitry 102 will select register 84 and will receive the other chip select control bits 94 by way of conductors 122. In addition, the bus loading control bits 90 will be provided to bus coupling circuitry 100 by way of select conductors 114. Control circuitry 102 may provided timing or other control information to bus coupling circuit 100 by way of conductors 116.

Based on the bus loading control bits 90, bus coupling circuitry 100 determines whether to couple the address conductors 110 of bus 24 to bus 60 or to bus 62. Likewise, based on the bus loading control bits 90, bus coupling circuitry determines whether to couple the data conductors 112 of bus 24 to bus 60 or to bus 62. In addition, bus loading control bits 90 determine whether bus coupling circuitry 100 provides the address and data values on the same bus (i.e. multiplexed on one of busses 60 or 62) or on different busses (i.e. non-multiplexed on both busses 60 and 62).

The plurality of terminals 124 are used to provide bus 60 external to data processor 10. The plurality of terminals 126 are used to provide bus 62 external to data processor 10. And, the plurality of terminals 128 are used to provide chip select signals 64–67 external to data processor 10.

While the present invention has been illustrated and described with reference to specific embodiments, further modifications and improvements will occur to those skilled in the art. It is to be understood, therefore, that this invention is not limited to the particular forms illustrated and that the appended claims cover all modifications that do not depart from the scope of this invention.

I claim:

1. A method for communicating address signals and data signals with a data processor, the data processor having a first bus and a second bus, the method comprising the steps of:
   determining if the data processor is in a first mode or a second mode;
   if the data processor is in the first mode, controlling a bus coupling circuit to provide the address signals by way of the first bus and to provide and receive the data signals by way of the second bus; and
   if the data processor is in the second mode, controlling the bus coupling circuit to provide and receive the data signals by way of the first bus and to provide the address signals by way of the second bus.

2. A method as in claim 1, further comprising the steps of:
   selecting the first mode by storing a first value in a register bit field; and
   selecting the second mode by storing a second value in the register bit field.

3. A method for providing address signals and data signals from a data processor, the data processor having a first bus and a second bus, the method comprising the steps of:
   determining if the data processor is in a first mode or a second mode;
   if the data processor is in the first mode, providing the address signals by way of the first bus and providing the data signals by way of the second bus;
   if the data processor is in the second mode, providing the data signals by way of the first bus and providing the address signals by way of the second bus;
   determining if the data processor is in a third mode or a fourth mode;
   if the data processor is in the third mode, providing both the address signals and the data signals by way of the first bus; and
   if the data processor is in the fourth mode, providing both the address signals and the data signals by way of the second bus.

4. A method as in claim 3, further comprising the steps of:
   selecting the first mode by storing a first value in a register bit field;
   selecting the second mode by storing a second value in the register bit field;
   selecting the third mode by storing a third value in the register bit field; and
   selecting the fourth mode by storing a fourth value in the register bit field.

5. A method for providing address signals and data signals from a data processor, the data processor having a first bus and a second bus, the method comprising the steps of:
   determining if the data processor is in a first mode or a second mode;
   if the data processor is in the first mode, providing the address signals by way of the first bus and providing the data signals by way of the second bus;
   if the data processor is in the second mode, providing the data signals by way of the first bus and providing the address signals by way of the second bus;
   providing a first register bit field which corresponds to a first address range;
   providing a second register bit field which corresponds to a second address range;

initiating a first bus cycle in response to receiving a first plurality of address signals;

if the first plurality of address signals belongs to the first address range, and the first register bit field stores a first value, placing the data processor in the first mode; and if the first plurality of address signals belongs to the second address range, and the second register bit field stores a second value, placing the data processor in the second mode.

6. A method as in claim 5, further comprising the steps of:

initiating a second bus cycle in response to receiving a second plurality of address signals;

if the second plurality of address signals belongs to the first address range, and the first register bit field stores a second value, placing the data processor in the second mode; and if the second plurality of address signals belongs to the second address range, and the second register bit field stores a first value, placing the data processor in the first mode.

7. A method as in claim 5, further comprising the steps of:

if the first plurality of address signals belongs to the first address range, providing a first chip select signal; and if the first plurality of address signals belongs to the second address range, providing a second chip select signal.

8. A data processor, comprising:

an address bus for providing an address value;

a data bus for providing a data value;

a first plurality of bus terminals;

a second plurality of bus terminals;

a first control register portion for storing a first mode control indicator; and bus coupling circuitry, coupled to said address bus, to said data bus, to said first plurality of bus terminals, to said second plurality of bus terminals, and to said first control register portion, if the first mode control indicator is a first value said bus coupling circuitry couples said address bus to said first plurality of bus terminals and provides the address value to said first plurality of bus terminals and couples said data bus to said second plurality of bus terminals and provides the data value to said second plurality of bus terminals, and if the first mode control indicator is a second value said bus coupling circuitry couples said data bus to said first plurality of bus terminals and provides the data value to said first plurality of bus terminals and couples said address bus to said second plurality of bus terminals and provides the address value to said second plurality of bus terminals.

9. A data processor as in claim 8, further comprising:

compare circuitry, coupled to said address bus for receiving at least a portion of the address value.

10. A data processor as in claim 9, further comprising:

chip select generation circuitry, coupled to said compare circuitry; and a plurality of chip select terminals for providing a plurality of chip select signals, said plurality of chip select terminals being coupled to said chip select generation circuitry.

11. A data processor, comprising:

an address bus for providing an address value;

a data bus for providing a data value;

a first plurality of bus terminals;

a second plurality of bus terminals;

a first control register portion for storing a first mode control value; and bus coupling circuitry, coupled to said address bus, to said data bus, to said first plurality of bus terminals, to said second plurality of bus terminals, and to said first control register portion, if the first mode control value is a first value said bus coupling circuitry couples said address bus to said first plurality of bus terminals and provides the address value to said first plurality of bus terminals and couples said data bus to said second plurality of bus terminals and provides the data value to said second plurality of bus terminals, and if the first mode control value is a second value said bus coupling circuitry couples said data bus to said first plurality of bus terminals and provides the data value to said first plurality of bus terminals and couples said address bus to said second plurality of bus terminals and provides the address value to said second plurality of bus terminals;

a second control register portion for storing a second mode control indicator;

wherein said first control register portion corresponds to a first address range and said second control register portion corresponds to a second address range, and wherein if the address value is in the second address range and if the second mode control indicator is the first value said bus coupling circuitry couples said address bus to said first plurality of bus terminals and provides the address value to said first plurality of bus terminals and couples said data bus to said second plurality of bus terminals and provides the data value to said second plurality of bus terminals, and if the second mode control indicator is the second value said bus coupling circuitry couples said data bus to said first plurality of bus terminals and provides the data value to said first plurality of bus terminals and couples said address bus to said second plurality of bus terminals and provides the address value to said second plurality of bus terminals.

12. A data processor as in claim 11, further comprising:

a central processing unit, coupled to said first and second control register portions.

13. A data processor as in claim 12, wherein said first control register portion is read and write accessible by said central processing unit.

14. A method for providing address values and data values in a data processing system having a first bus and a second bus, the method comprising the steps of:

providing a first register control field corresponding to a first address range;

providing a second register control field corresponding to a second address range;

if a first one of the address values is in the first address range, selecting a bus mode of the data processing system by way of the first register control field;

the first one of the address values is in the second address range, selecting the bus mode of the data processing system by way of the second register control field;

determining if the bus mode is selected to be a first mode or a second mode or a third mode or a fourth mode;

if the bus mode is selected to be the first mode, providing the first one of the address values by way of the first bus and providing a first one of the data values by way of the second bus;

if the bus mode is selected to be the second mode, providing the first one of the data values by way of the first bus and providing the first one of the address values by way of the second bus;

the bus mode is selected to be the third mode; providing both the first one of the address values and the first one of the data values by way of the first bus; and if the bus mode is selected to be the fourth mode, providing both the first one of the address values and the first one of the data values by way of the second bus.

15. A method as in claim 14, further comprising the steps of:

if a second one of the address values is in the first address range, selecting the bus mode of the data processing system by way of the first register control field;

if the second one of the address values is in the second address range, selecting the bus mode of the data processing system by way of the second register control field;

determining if the bus mode is selected to be the first mode or the second mode or the third mode or the fourth mode;

if the bus mode is selected to be the first mode, providing the second one of the address values by way of the first bus and providing a second one of the data values by way of the second bus;

if the bus mode is selected to be the second mode, providing the second one of the data values by way of the first bus and providing the second one of the address values by way of the second bus;

if the bus mode is selected to be the third mode, providing both the second one of the address values and the second one of the data values by way of the first bus; and if the bus mode if selected to the fourth mode, providing both the second one of the address values and the second one of the data values by way of the second bus.

16. A method as in claim 14, further comprising the step of:

performing a write access to the first register control field to program the bus mode corresponding to the first address range.

17. A method as in claim 14, further comprising the steps of:

if the first one of the address values belongs to the first address range, providing a first chip select signal; and if the first one of the address values belongs to the second address range, providing a second chip select signal.

18. A method as in claim 14, further comprising the steps of:

selecting the bus mode to be the first mode for the first address range by storing binary 00 in the first register control field;

selecting the bus mode to be the second mode for the first address range by storing binary 11 in the first register control field;

selecting the bus mode to be the third mode for the first address range by storing binary 01 in the first register control field; and selecting the bus mode to be the fourth mode for the first address range by storing binary 10 in the first register control field.

19. A data processor, comprising:

a first communication bus;

a second communication bus;

a central processing unit;

a system integration unit for controlling the first communication bus and the second communication bus;

wherein if the data processor is in a first communication mode, the system integration unit controls the first communication bus for communication of address signals and the second communication bus for communication of data signals;

wherein if the data processor is in a second communication mode, the system integration unit controls the first communication bus for communication of data signals and the second communication bus for communication of address signals; and wherein if the data processor is in a third communication mode, the system integration unit controls the first communication bus for communication of address signals and data signals.

20. A data processor as in claim 19, wherein instruction processing within the central processing unit is independent of communication control performed by the system integration unit on the first communication bus and on the second communication bus.

21. A data processor as in claim 20, wherein said data processor further comprises:

compare circuitry, said compare circuitry receiving address signals from the central processing unit;

wherein said compare circuitry receives a first address signal from the central processing unit and determines if the first address signal is in a first address range or a second address range; and wherein if the first address signal is in the first address range said compare circuitry effects a first communication mode and if the first address signal is in the second address range said compare circuitry effects a second communication mode.

* * * * *

UNITED STATES PATENT AND TRADEMARK OFFICE
CERTIFICATE OF CORRECTION

PATENT NO.   :   5,638,520
DATED        :   June 10, 1997
INVENTOR(S)  :   William C. Moyer It is certified that error appears in the above-identified patent and that said Letters Patent is hereby corrected as shown below:

Claim 14, column 14, line 56, replace "the first" with --if the first--.

Signed and Sealed this

Sixth Day of October, 1998

Attest:

BRUCE LEHMAN

Attesting Officer

Commissioner of Patents and Trademarks